(12) United States Patent
Shaw et al.

(10) Patent No.: US 8,989,024 B2
(45) Date of Patent: Mar. 24, 2015

(54) LONG TERM EVOLUTION NETWORK DYNAMIC OVERLOAD MANAGEMENT

(75) Inventors: Venson M. Shaw, Kirkland, WA (US);
Terry Figurelle, Redmond, WA (US);
Qingmin Hu, Sammamish, WA (US);
Ryan Eric Redfern, Cerritos, CA (US);
Jianrong Wang, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/525,554

(22) Filed: Jun. 18, 2012

(65) Prior Publication Data

US 2013/0336118 A1    Dec. 19, 2013

(51) Int. Cl.
*H04L 12/26* (2006.01)
*H04L 12/721* (2013.01)
*H04L 12/891* (2013.01)

(52) U.S. Cl.
USPC ............ 370/251; 370/252; 370/351; 370/464

(58) Field of Classification Search
USPC ......... 370/229, 235, 236, 241, 252, 351, 389, 370/912
See application file for complete search history.

(56) References Cited

U.S. PATENT DOCUMENTS

| | | | | |
|---|---|---|---|---|
| 6,744,824 | B1 * | 6/2004 | Duvaut et al. | 375/296 |
| 2003/0202476 | A1 * | 10/2003 | Billhartz et al. | 370/236 |
| 2007/0233896 | A1 * | 10/2007 | Hilt et al. | 709/238 |
| 2009/0067835 | A1 * | 3/2009 | Chen | 398/45 |
| 2010/0067376 | A1 * | 3/2010 | Lee et al. | 370/230 |
| 2011/0051736 | A1 * | 3/2011 | Takenouchi | 370/401 |
| 2011/0122854 | A1 * | 5/2011 | De Lind Van Wijngaarden | 370/338 |
| 2011/0222406 | A1 * | 9/2011 | Persson et al. | 370/236 |
| 2011/0310811 | A1 * | 12/2011 | Yamada | 370/329 |
| 2012/0030362 | A1 * | 2/2012 | Twitchell, Jr. | 709/227 |
| 2012/0131225 | A1 * | 5/2012 | Chiueh et al. | 709/246 |
| 2013/0010622 | A1 * | 1/2013 | Horn et al. | 370/252 |

* cited by examiner

*Primary Examiner* — Omar Ghowrwal
(74) *Attorney, Agent, or Firm* — Baker & Hostetler LLP

(57) ABSTRACT

A downstream device in a network may monitor and collect data on its condition, including detecting overload conditions, and transmit such data to an upstream network device. The upstream network device may select a best downstream device for a particular traffic flow based on condition data received from downstream devices and transmit the traffic flow to the selected downstream device. A network management server may be configured to perform similar functions, instructing network devices on how to transport data through a network based on condition data received from such devices.

20 Claims, 12 Drawing Sheets

LONG TERM EVOLUTION NETWORK DYNAMIC OVERLOAD MANAGEMENT

TECHNICAL FIELD

The technical field generally relates to wireless communications and more specifically relates to dynamically providing overload management and protection in long term evolution (LTE) networks.

BACKGROUND

In current wireless networks, such as long term evolution (LTE) networks, network elements may be arranged in a type of hierarchy, with one upstream network element providing traffic to several downstream network elements. For example, one core network element may transmit data to several non-core or edge network elements. When the downstream network elements begin to receive too much traffic to handle and become overloaded, the performance of such elements may deteriorate and thereby adversely affect customer service. However, there is typically no means for the downstream network element to notify the upstream network element of this overload condition. The upstream network element may have access to alternate routes for providing the traffic to the end user, but since the upstream network element is not aware of the overload condition on the downstream element, if the downstream element is otherwise the best device to receive the traffic for transit to the end user, the upstream element will continue to send traffic to the overloaded downstream element.

In many wireless (and other) networks, a server-centric monitoring system where a server is statically configured to collect a limited set of data from network elements in order to determine network conditions and performance. In such configurations, the individual network elements are not capable of intelligently collecting and/or providing monitoring information to a monitoring system. The monitoring information that is in use is not granular but rather device or system level (i.e., not information regarding individual user devices and/or calls). Moreover, such systems do not allow for effective, automatic overload protection or mitigation. Some efforts in place to attempt to address these deficiencies of the current state of the art include using traces and third-party probe systems, but these efforts are not easily implemented for every network element in a network and are too costly and invasive to run continuously on an around-the-clock basis.

SUMMARY

A downstream device in a network may monitor and collect data on its condition, including detecting overload conditions, and transmit such data to an upstream network device. The upstream network device may use condition data collected from several downstream devices to select a best downstream device for a particular traffic flow based on the received condition data and transmit the traffic flow to the selected downstream device. Condition data may be collected at downstream devices for the device as a whole, or for individual components (e.g., individual hardware components, software components, attached users, etc.). Network devices may be virtualized, with several virtual network elements residing on a single physical network element. Network elements (physical or virtual) may communicate with upstream network elements using physical or virtual links, or a combination thereof A network management server may be configured receive condition data from network elements and instruct the network elements on how to transport data through a network based on condition data received from such devices. Each network element may be configured with one or more smart agents that intelligently collect and report data to the network management server. The network management server may instruct the smart agents or network elements on the specific means to be used to collect, process, and report condition data. These and other aspects of the present disclosure are set forth in more detail below and in the figures.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
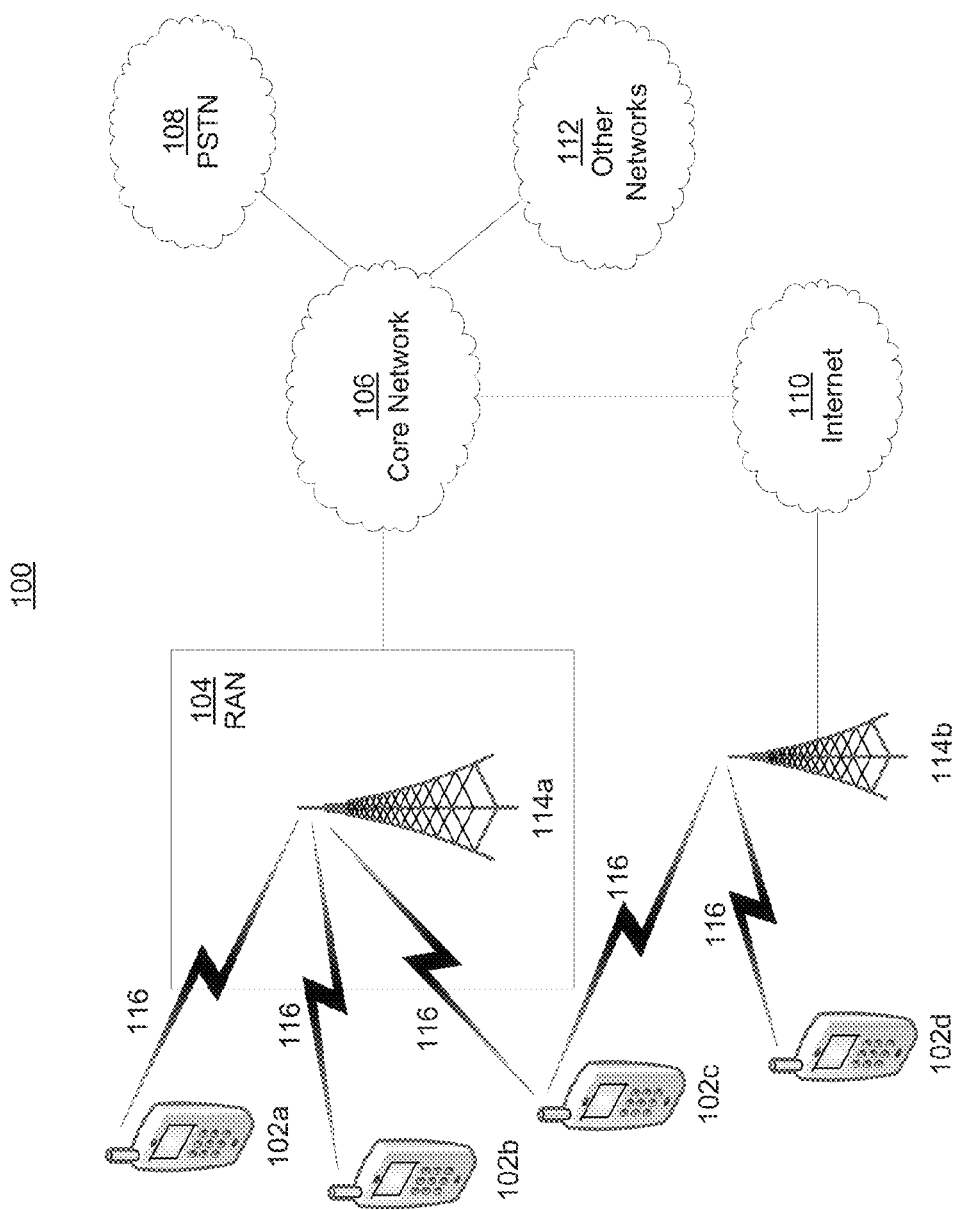
FIG. 1A is a system diagram of an example communications system in which dynamic overload management may be implemented.

FIG. 1A is a diagram of an example communications system 100 in which overload management systems and methods may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
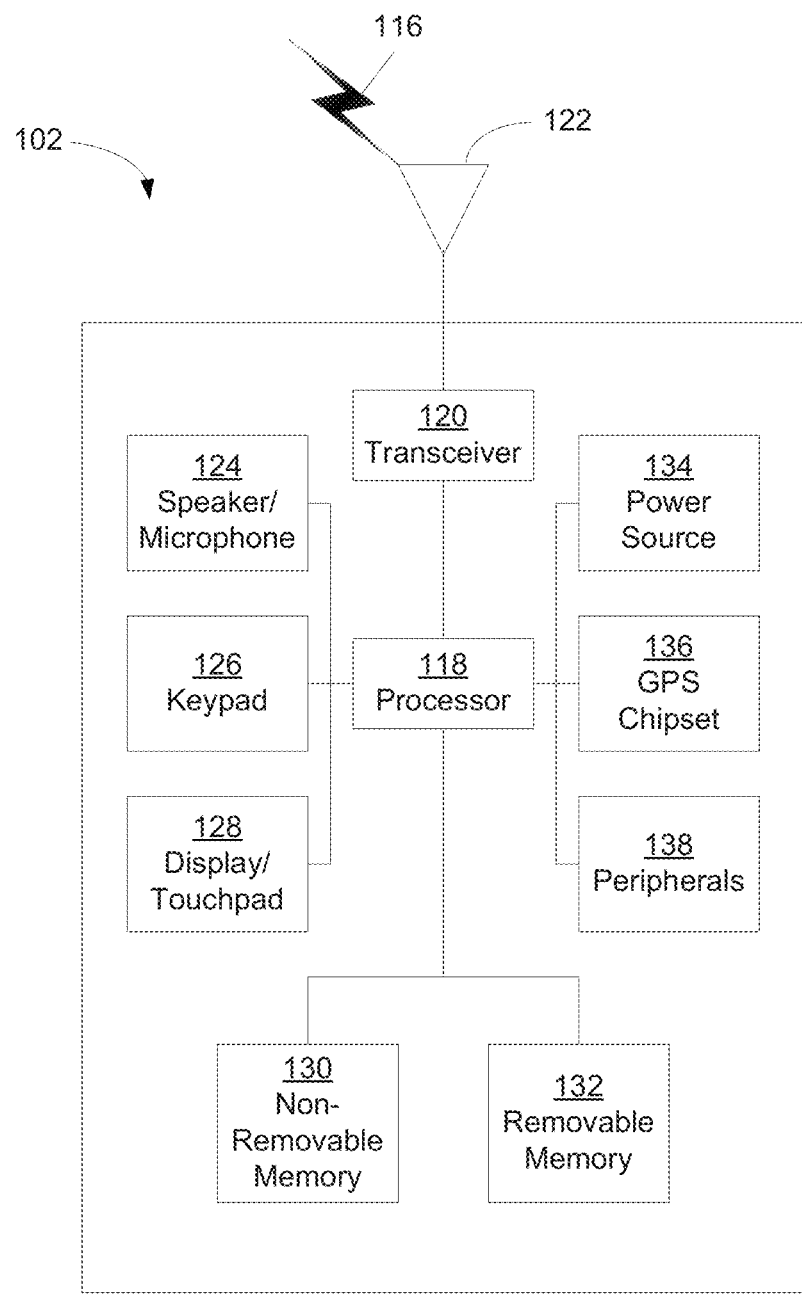
FIG. 1B is a system diagram of an example mobile device (also referred to as a wireless transmit/receive unit (WTRU) and/or as user equipment (UE)) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
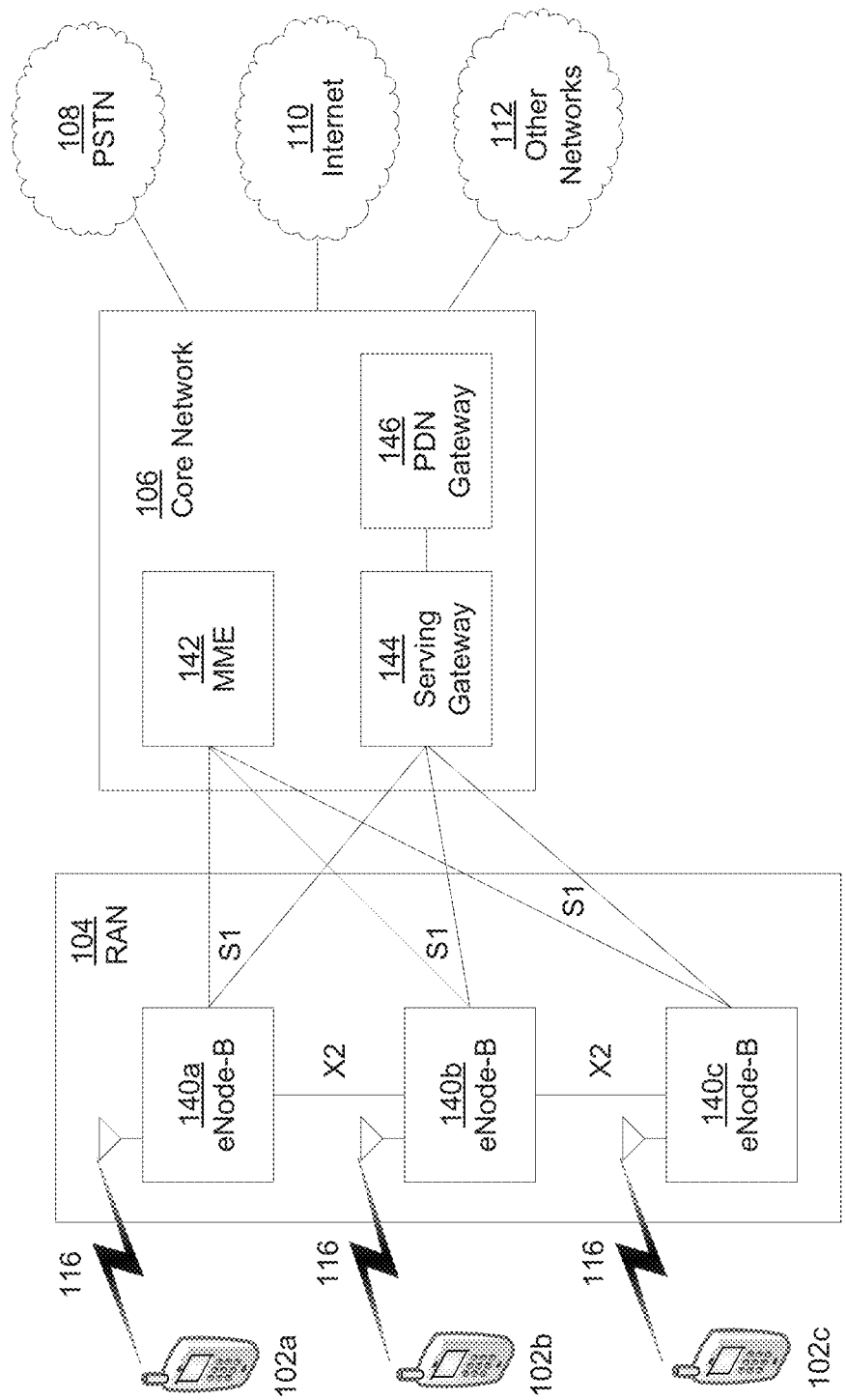
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
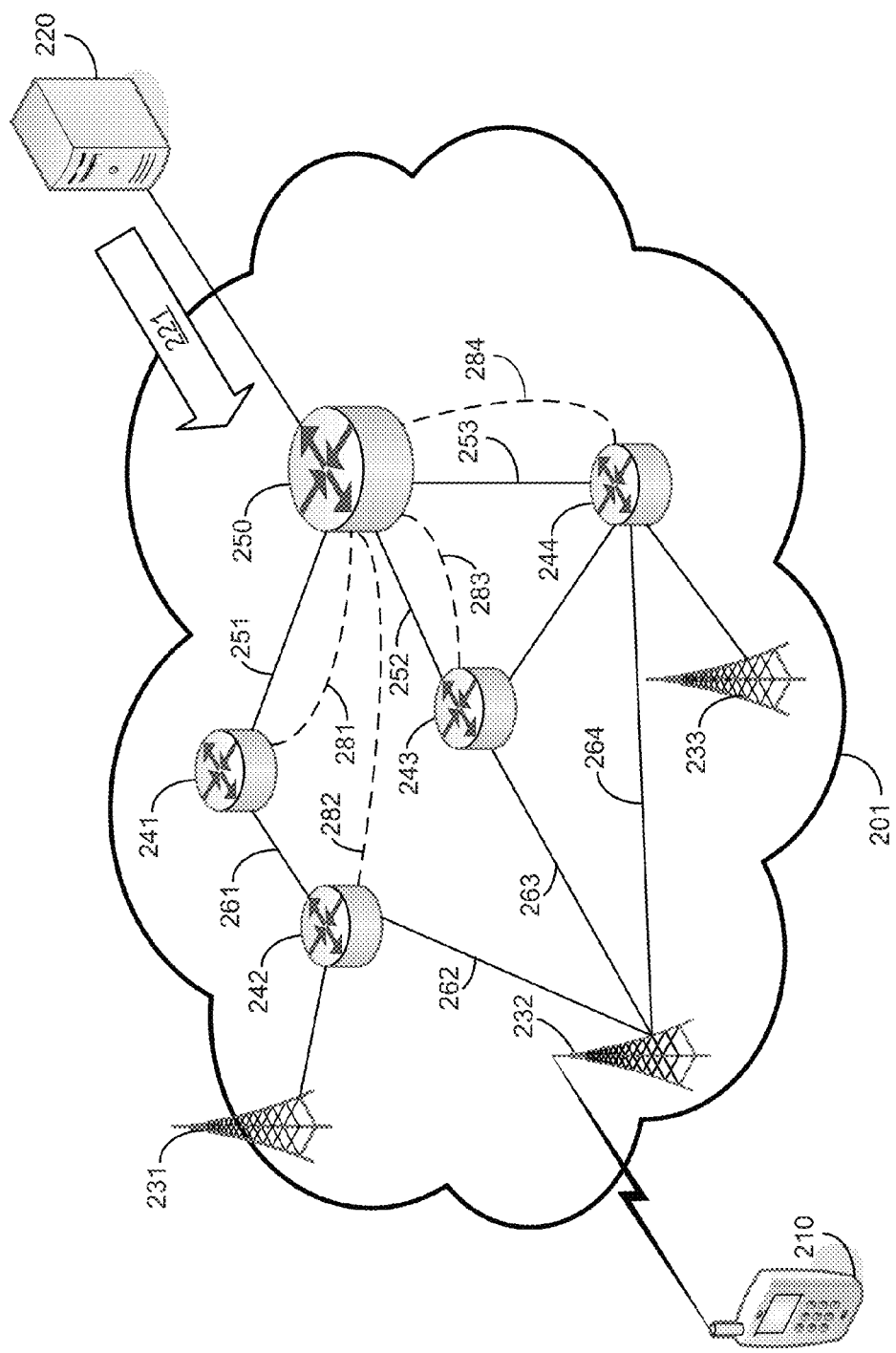
FIG. 2 illustrates a non-limiting exemplary network configuration in which dynamic overload management may be implemented.

FIG. 2 illustrates an exemplary network configuration and signal flow that may be used in an embodiment. Mobiles device 210, in an embodiment operated by a customer of a provider of network 201, may be engaged in a communications session with device 220 using network 201. Communications 221 may be transmitted from device 220 to mobile device 210. Communications 221 may be any type of communications, including one or more packets, a portion of or an entire IP flow, or any other type of data or means of transporting data. Mobile device 210 may be any type of wireless communications device, including a UE, a WTRU, or any other communications device as disclosed herein, or any other type of device capable of being configured to perform the functions and features of the present disclosure. Network 201 may be any type of communications network, including a wireless network, a wired network, and a combination thereof, implementing any number and type of communications protocols and technologies. Device 220 may be any type of computing device or any number or combination of such devices, and may provide data, content, or any other service to mobile device 210. Device 220 may also be another mobile communications device, including any such device disclosed herein, and may be operated by a customer or other user. All such embodiments are contemplated as within the scope of the present disclosure.

Within network 201 may be links 251, 252, 253, 261, 262, 263, and 264. Each of these links may be wired or wireless, logical, and/or physical, and may use any means for facilitating data transport across each respective link. Also present in network 201 and connecting to these links as shown in FIG. 2 may be devices 241, 242, 243, 244, and 250, as well as any other devices. Each of these devices may serve a particular function or be a particular device within a wireless network, such as a base station, an eNodeB, a serving gateway (SGW), a packet data network (PDN) gateway (PGW), an HSS, an MMS, a router, a cell tower, a gateway, a proxy server, or any other device that performs any other function or combination of functions that may be present in a wireless network. Cell towers 231, 232, and 233 may be present in network 201 and may provide communications connections to wireless mobile devices such as mobile device 210. Note that the devices, links, and towers shown in FIG. 2 are simplified examples of devices that may be present in a network, and are set forth herein for exemplary purposes. No limitations on the disclosed subject matter should be construed based on the exemplary configuration shown in FIG. 2 and described herein.

Network 201 may be configured to normally transport communications 221 to mobile device 210 via devices 250 and 243, across links 252 and 263, ultimately providing communications 221 to tower 232 for wireless transmission to mobile device 210. This route for traffic to mobile device 210 may be optimal under normal operating conditions, or may otherwise be the best path for such traffic as determined by an operator of network 201 for any reason. However, in the event that one or more of the devices in the path becomes overloaded, an alternate path that may normally be considered suboptimal may become a better path in terms of providing service to mobile device 210 due to such an overload.

In an embodiment, upstream network device 250 may be communicatively connected to downstream network devices 241, 242, 243, and 244 via links 281, 282, 283, and 284 for the purposes of receiving and transmitting communications indicating overload and/or other device conditions from such downstream devices. Links 281, 282, 283, and 284 may be logical links that may use existing links that also carry end-user traffic, such as links 251, 252, 253, and 261, or these connections may be physical and/or logical alternate links that may be dedicated to communicating device condition indications. Such communications may be in-band (i.e., transmitted with typical end-user traffic) or out-of-band (i.e., transmitted using alternate means that are not used for typical end-user traffic). Note that such condition indicator may be exchanged throughout a network and/or among peer devices, such as core network devices, in a network, or any combination thereof All such embodiments are contemplated as within the scope of the present disclosure.

Each of downstream network devices 241, 242, 243, and 244 may transmit to upstream network device 250 a current condition of the respective device. Alternatively, each of downstream network devices 241, 242, 243, and 244 may only transmit communications to upstream network device 250 that report or otherwise indicate a problem or adverse condition such as overload (e.g., alarms, etc.). Any communications from downstream network devices 241, 242, 243, and 244 may be provided in response to a poll or query from upstream network device 250, or may be proactively provided to upstream network device 250 without an inquiry from upstream network device 250 required. Upstream network device 250 may collect such reports or indications from each of the downstream network devices and perform a comparison to determine whether each device is overloaded, and, in an embodiment, the level of overload. The resulting determination may indicate the downstream devices that are not overloaded or are less overloaded than other downstream devices. In response, upstream network device 250 may direct traffic away from one or more overloaded devices.

For example, network device 250 may receive, via link 283, an indication transmitted by device 243 that device 243 is overloaded, has too much traffic to handle properly, or otherwise is unable to operate at a sufficient level. In response, network device 250 may determine the alternate devices that are capable of transporting communications 221 to tower 232 and subsequently mobile device 210. For example, network device 250 may determine that devices 241 and 244 are capable of transmitting communications 221 along a path that ultimately will provide communications 221 to mobile device 210. Network device 250 may then determine from among such devices the device and/or path associated with a device that has the least amount of overload or is not overloaded. In the event that several devices and/or paths are available that are not overloaded, device 250 may further refine its results to select the device and/or path that may provide the best service to the customer based on a variety of criteria known to those skilled in the art (e.g., latency, geographical distance, available bandwidth, etc.). For example, device 250 may determine that devices 244 and 241 are not overloaded, and may then select device 244 for transport of communications 221 because the geographical distance between device 244 and tower 232 may be less than the geographical distance between device 241 and tower 232. Alternatively, device 250 may determine that device 244 is somewhat overloaded but device 241 is not overloaded and that device 242 is not overloaded, and may then select device 241 for transport of communications 221 via device 242 because that particular path is the least overloaded of the available paths. Any other decision and means or methods of making such a decision are contemplated as within the scope of the present disclosure.

In an embodiment, which may be used in combination with any other embodiments set forth herein, the protocol used to report network conditions among devices may be one or more of the general packet radio service (GPRS) tunneling protocols (GTP), GTP-C, GTP-U and GTP' (GTP prime). While GTP-C may often be used for signaling between network nodes, in an embodiment, GTP-C, which is typically used for carrying user traffic, may be used for transporting device condition indications and/or reports as disclosed herein. Likewise, GTP', often be used for transporting charging data, may be used for transporting device condition indications and/or reports as disclosed herein. All such embodiments are contemplated as within the scope of the present disclosure.

In another embodiment, which may be used in combination with any other embodiments set forth herein, the protocol used to report network conditions among devices may be the Diameter protocol. While the Diameter protocol may often be used as an authentication, authorization, and/or accounting protocol, in an embodiment, the Diameter protocol may be used for transporting device condition indications and/or reports as disclosed herein. In an embodiment, the Diameter protocol may be used within a policy management framework. In such an embodiment, the network elements may exchange device condition information using one or both of the 3GPP functions policy and charging rule function (PCRF) and policy and charging enforcement function (PCEF). For example, the LTE Sp interface may be used to transmit and/or receive device condition information to/from a subscription profile repository (SPR) using the PCRF. Alternatively, or in addition, the LTE Sy interface may be used to transmit and/or receive device condition information to/from a resource and admission control function (RACF) using the PCRF. Alternatively, or in addition, the LTE Gp interface may be used to transmit and/or receive device condition information to/from an interexchange carrier (IXC) using the PCRF. In any such embodiments, PCEF may be used rather than, or in addition to, PCRF. All such embodiments are contemplated as within the scope of the present disclosure.

In an embodiment, implemented in an LTE network, radio access network elements, such as eNode-Bs, may communicate device condition information to core devices such as an MME at the control plane. For example, each of devices 241, 242, 243, and 244 may be an eNode-B, and device 250 may be an MME. In another embodiment, implemented in a 3G network, radio access network elements, such as RNCs or Node Bs, may communicate device condition information to core devices such as a service GPRS support node (SGSN) at the control plane. For example, each of devices 241, 242, 243, and 244 may be an RNC or Node B, and device 250 may be an SGSN. In such embodiments, and any other embodiments disclosed herein, communications between the upstream and downstream devices may take place using the stream control transmission protocol (SCTP).

In another embodiment, implemented in an LTE network, radio access network elements, such as eNode-Bs, may communicate device condition information to a core device such as an SGW at the user plane. For example, each of devices 241, 242, 243, and 244 may be an eNode-B, and device 250 may be an SGW. In another embodiment, implemented in a 3G network, radio access network elements, such as RNCs or Node Bs, may communicate device condition information to a core device such as an SGSN, gateway GPRS support node (GGSN), and/or an SGW at the user plane. For example, each of devices 241, 242, 243, and 244 may be an RNC or Node B, and device 250 may be an SGSN, GGSN, or SGW. In such embodiments, and any other embodiments disclosed herein, communications between the upstream and downstream devices may take place using UDP and/or GTP-U protocols. In GTP embodiments, the GTP header may be used to provide some or all of the communicated overload data.

Note that in some situations, a mobile device may be able to communicate only with one radio access network element, and therefore may be essentially unreachable if that network element is not available due to being in an overload condition. One or more core network devices may treat such a mobile device as unreachable for the duration of the overload condition. Alternatively, the mobile device may be capable of communicating with more than one radio access network element, and may therefore be instructed to communicate with the less overloaded element. All such embodiments are contemplated as within the scope of the present disclosure.

Figure 3:
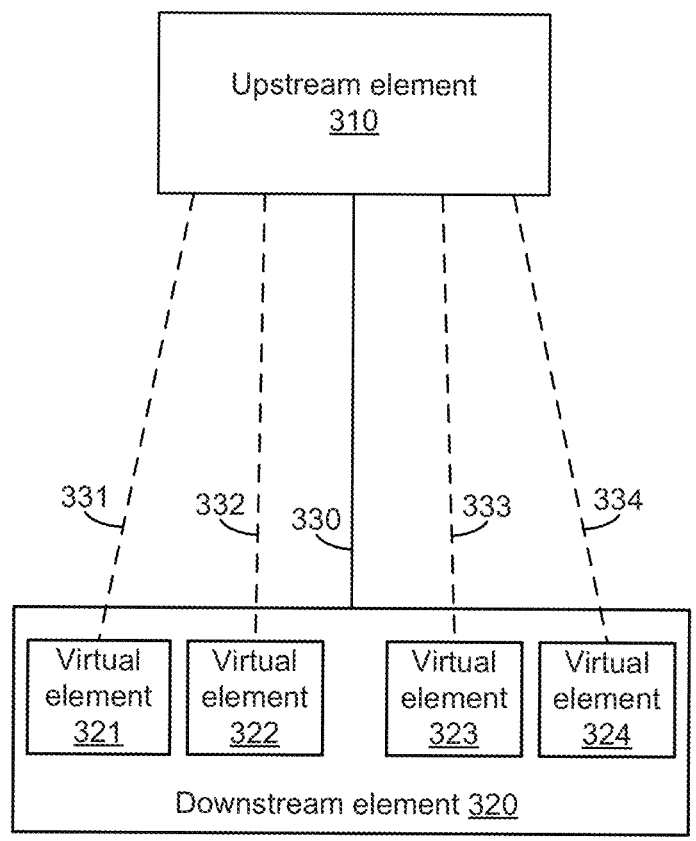
FIG. 3 illustrates another non-limiting exemplary network configuration in which dynamic overload management may be implemented.

In an embodiment, a downstream network element, such as any downstream network element shown in FIG. 2, may be virtualized into one or more virtual downstream network elements. Each of these one or more virtual downstream elements may establish and maintain one or more logical communications links to one or more upstream network elements. FIG. 3 illustrates an example of such an embodiment. Downstream element 320 may be connected to upstream element 310 via physical or wireless link 330. Downstream element 320 may be configured with virtual elements 321, 322, 323, and 324. Each of these virtual elements may represent any physical, logical, or software component of downstream element 320. For example, each virtual element may represent a card, processor, communications port, transceiver, or some other physical component of downstream element 320. Alternatively, or in addition, each virtual element may represent a user device or a set of user devices currently attached to or otherwise communicating with downstream element 320. In another embodiment, each virtual element may represent a traffic flow or a set of traffic flows being processed through downstream element 320. Any type or method of virtualization is contemplated as within the scope of the present disclosure.

Each of virtual elements 321, 322, 323, and 324 may communicate overload condition information and any other information pertaining to the respective virtual element to upstream element 310 using virtual or logical communications sessions or links 331, 332, 333, and 334, respectively. Each of these virtual links or sessions may be used to exchange any type of information disclosed herein or any other information that may be helpful to one or more upstream elements in determining how to best direct traffic flows so as to avoid overloaded devices and/or network elements (whether virtual or physical). Note that these virtual links may be dedicated to transporting condition information, or these virtual links may also be used for end-user traffic. All such embodiments are contemplated as within the scope of the present disclosure.

By using virtual devices and separate virtual communications links for one physical device, traffic may be better directed around overloaded or otherwise impaired devices. For example, if virtual element 322 reports an overload condition, but the remaining virtual elements of downstream element 320 are not overloaded, or are less overloaded, then upstream element 310 may transmit traffic originally destined for virtual element 322 to one or more of virtual elements 321, 323, and 324 that may be capable of providing such traffic to the ultimate destination device or the next point of transit for such traffic. In an embodiment, such traffic may be transmitted via the respective virtual ink associated with the selected virtual element.

Figure 4:
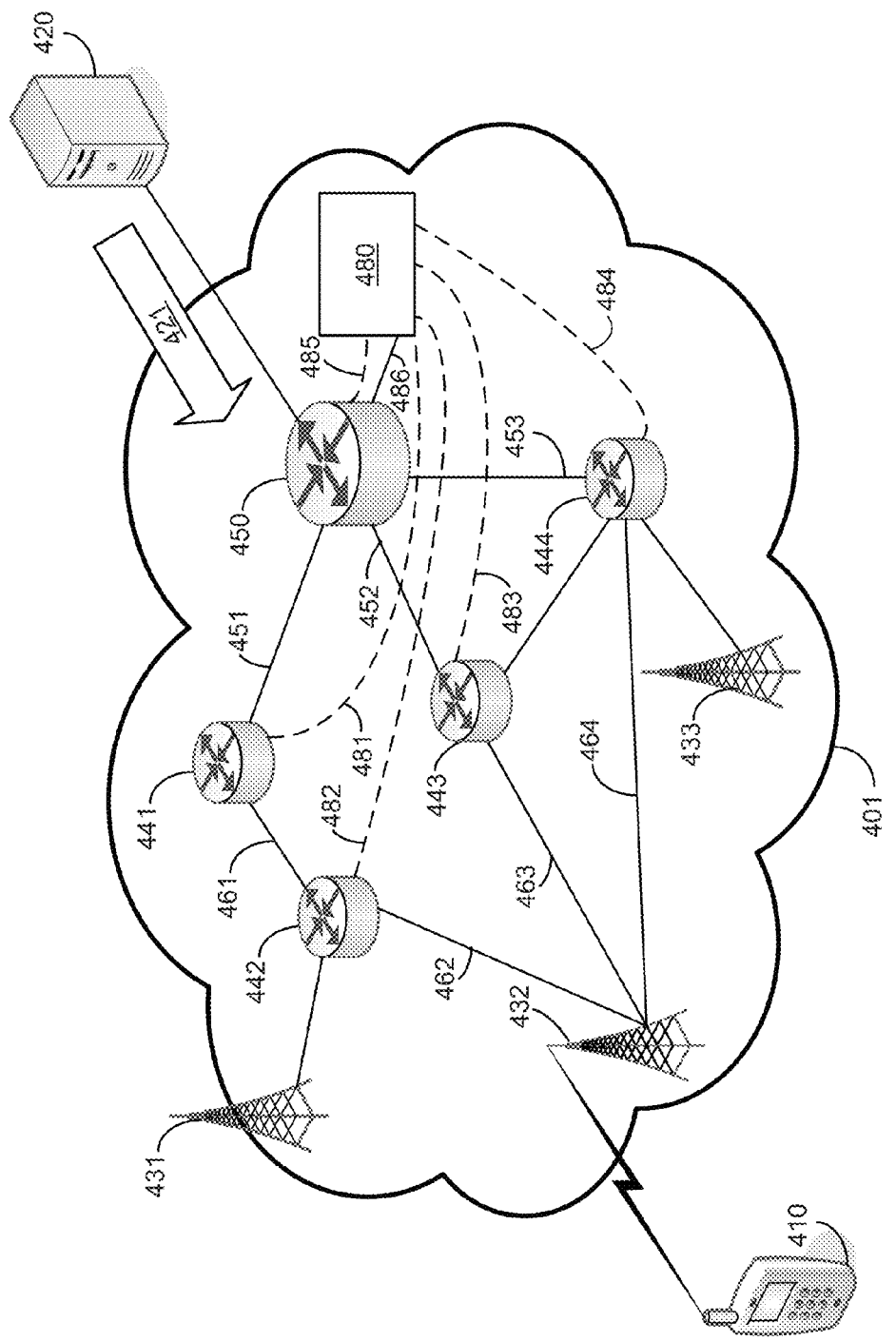
FIG. 4 illustrates another non-limiting exemplary network configuration in which dynamic overload management may be implemented.

FIG. 4 illustrates an exemplary network configuration and signal flow that may be used in another embodiment. Mobile device 410, in an embodiment operated by a customer of a provider of network 401, may be engaged in a communications session with device 420 using network 401. Communications 421 may be transmitted from device 420 to mobile device 410. Communications 421 may be any type of communications, including one or more packets, a portion of, or an entire, IP flow, or any other type of data or means of transporting data. Mobile device 410 may be any type of wireless communications device, including a UE, a WTRU, or any other communications device as disclosed herein, or any other type of device capable of being configured to perform the functions and features of the present disclosure. Network 401 may be any type of communications network, including a wireless network, a wired network, and a combination thereof, implementing any number and type of communications protocols and technologies. Device 420 may be any type of computing device or any number or combination of such devices, and may provide data, content, or any other service to mobile device 410. Device 420 may also be another mobile communications device, including any such device disclosed herein, and may be operated by a customer or other user. All such embodiments are contemplated as within the scope of the present disclosure.

Within network 401 may be links 451, 452, 453, 461, 462, 463, 464, and 486. Each of these links may be wired or wireless, logical, and/or physical, and may use any means for facilitating data transport across each respective link. Also present in network 401 and connecting to these links as shown in FIG. 4 may be devices 441, 442, 443, 444, and 450, as well as any other devices. Each of these devices may serve a particular function or be a particular device within a wireless network, such as a base station, an eNodeB, a serving gateway (SGW), a packet data network (PDN) gateway (PGW), an HSS, an MMS, a router, a cell tower, a gateway, a proxy server, or any other device that performs any other function or combination of functions that may be present in a wireless network. Cell towers 431, 432, and 433 may be present in network 401 and may provide communications connections to wireless mobile devices such as mobile device 410. Note that the devices, links, and towers shown in FIG. 4 are simplified examples of devices that may be present in a network, and are set forth herein for exemplary purposes. No limitations on the disclosed subject matter should be construed based on the exemplary configuration shown in FIG. 4 and described herein.

Network 401 may be configured to normally transport communications 421 to mobile device 410 via devices 450 and 443, across links 452 and 463, ultimately providing communications 421 to tower 432 for wireless transmission to mobile device 410. This route for traffic to mobile device 410 may be optimal under normal operating conditions, or may otherwise be the best path for such traffic as determined by an operator of network 401 for any reason. However, in the event that one or more of the devices in the path becomes overloaded, an alternate path that may normally be considered suboptimal may become a better path in terms of providing service to mobile device 410 due to such an overload.

In an embodiment, each of upstream network device 450 and downstream network devices 441, 442, 443, and 444 may be connected to device 480 via links 485, 481, 482, 483, and 484 for the purposes of receiving and transmitting communications indicating overload and/or other device conditions from such downstream devices. Device 480 may be a device configured to manage and direct traffic, or otherwise cause traffic to be directed in a particular fashion, on a portion of network 401. In an embodiment, device 480 may be referred to as an element management system, and may include one or more device components, systems, and subsystems that may be configured to perform the functionality disclosed herein.

Links 485, 481, 482, 483, and 484 may be logical links that may use existing physical links that also carry end-user traffic, such as links 486, 451, 452, 453, and 461, or these connections may be physical and/or logical alternate links that may be dedicated to communicating device condition indications. Such communications may be in-band (i.e., transmitted with typical end-user traffic) or out-of-band (i.e., transmitted using alternate means that are not used for typical end-user traffic). Such conditions may be communicated using any protocol, system, or other means set forth herein or any other means or methods. Note that such condition indicators may be exchanged throughout a network and/or among peer devices, such as core network devices, in a network, or any combination thereof. All such embodiments are contemplated as within the scope of the present disclosure.

Each of downstream network devices 441, 442, 443, 444, and upstream network device 450 may transmit a current condition of the respective device to device 480. Alternatively, each of downstream network devices 441, 442, 443, 444, and upstream network device 450 may only transmit communications to device 480 that report or otherwise indicate a problem or adverse condition such as overload (e.g., alarms, etc.). Any communications from downstream network devices 441, 442, 443, 444, and upstream network device 450 may be in response to a poll or query received from device 480, or may be proactively provided to device 480 without an inquiry from device 480 required. Device 480 may use one or more counters to determine a when to poll or query devices on network 401, or to determine when scheduled reports from devices in network 401 are due and to request such reports if not received upon counter expiration. Device 480 may collect such reports or indications from each of the downstream network devices and perform a comparison to determine whether each device is overloaded, and, in an embodiment, the level of overload. The resulting determination may indicate the downstream and/or upstream devices that are not overloaded or are less overloaded than other devices. In response, device 480 may instruct other devices within network 401 to direct traffic away from one or more overloaded devices.

For example, device 480 may receive, via link 483, an indication transmitted by device 443 that device 443 is overloaded, has too much traffic to handle properly, or otherwise is unable to operate at a sufficient level. In response, device 480 may determine the alternate devices that are capable of transporting communications 421 to tower 432 and subsequently to mobile device 410. For example, device 480 may determine that devices 441 and 444 are capable of transmitting communications 421 along a path that ultimately will provide communications 421 to mobile device 410. Device 480 may then determine from among such devices the device and/or path associated with a device that has the least amount of overload or is not overloaded. Beyond avoiding overloaded devices, device 480 may also, or instead, determiner paths for traffic flows and/or any other data being transported using network 401, such that traffic is as evenly distributed across network 401, or a portion thereof, as possible so that the likelihood of overload is minimized or reduced.

In the event that several devices and/or paths are available that are not overloaded, device 480 may further refine its results to select the device and/or path that may provide the best service to the customer based on a variety of criteria known to those skilled in the art (e.g., latency, geographical distance, available bandwidth, etc.). For example, device 480 may determine that devices 444 and 441 are not overloaded, and may then select device 444 for transport of communications 421 because the geographical distance between device 444 and tower 432 is less than the geographical distance between device 441 and tower 432. Device 480 may then instruct device 450, for example via link 485, to direct communications 421 to device 444. Alternatively, device 480 may determine that device 444 is somewhat overloaded but device 441 is not overloaded and that device 442 is not overloaded, and may then select device 441 for transport of communications 421 via device 442 because that particular path is the least overloaded of the available paths. Device 480 may then instruct device 450, for example via link 485, to direct communications 421 to device 441. Any other decision and means or methods of making such a decision are contemplated as within the scope of the present disclosure.

In an embodiment, each of the devices 441, 442, 443, 444, and 450, and any other network elements, may be configured with a "smart agent" that may be a software and/or hardware component executing on the respective element. The smart agent may be configured to log or otherwise store element condition data for further processing and/or transmission to a server, such as device 480, thus enabling each element to be more actively involved in overload and general network management. Element condition data may be any data that may be used for network management, including event identifiers, timestamps, element identifiers, virtual element identifiers, and trace data. A smart agent may have interfaces or otherwise have the ability to communicate with and/or collect data from any hardware and/or software component on the element on which it is configured.

In an embodiment, each network element or virtual element may be associated with a state machine, and state machine data for each element or virtual element may be recorded and used for network management. For example, upon a change of state, a record of the previous state, the current state, the state change triggering event, identifying information, and/or timestamp information may be recorded. Any other data may be recorded and/or processed on a smart agent configured on a network element.

Smart agents may be instructed as to the particular data to collect and/or report by a server, such as device 480. Smart agents may be instructed, or otherwise configured, to transmit different data collected at different priorities. For example, overload data or data indicating an overload condition may be sent to a server with high priority while other data may be sent with normal or low priority. This may be a condition-dependent configuration. For example, where a particular element may be configured to process and transmit condition data as normal priority data, if the element on which the smart agent is configured is in overload condition (e.g., processor is overloaded or links connected to the element are congested), only alerts regarding the overload condition may be processed as high priority, while all other data regarding device condition may be processed and transmitted at low priority in an effort to conserve resources on the already-overloaded element. Any other means or methods of configuring such a smart agent are contemplated as within the scope of the present disclosure.

Smart agents may be configured to reject some instructions received from a server, for example, if the instruction is not possible (e.g., monitor a non-existing component). In acknowledging instructions received from a server, a smart agent may transmit an indication of acceptance or rejection of one or more instructions received from the server.

In an embodiment, a server that interacts with smart agents, such as device 480, may be referred to as a managing server and may partition a network or a portion of a network for which it is responsible into sub-networks for purposes of monitoring and directing traffic flows. Such partitioning may be based on geographical location, service type, device type, or any other criteria. The managing server may maintain physical and/or logical interfaces with devices and/r the smart agents that may be configured thereon. The managing server may assign unique (within the entire network or within the partitioned portion) identifiers for each network element within the sub-network. Alternatively, the managing server may use existing configuration or identifying data, such as MAC addresses, IP addresses, etc., to identify each element.

The managing server may determine and transmit instructions to each smart agent indicating the data to be collected (e.g., traces, logs of utilization, etc.), the level of detail to be collected for such data, whether and how to augment and/or aggregate such data, whether and how to report correlation data, whether and how to filter such data, reporting requirements (e.g., time and/or frequency of reporting condition data, conditions for reporting data at a particular priority, etc.), and any other relevant instructions. Instructions may be tailored for individual elements or elements of a certain type or meeting any particular criteria may be provided the same instructions.

A managing server may process received data to ensure that integrity checks are successful, correlate data across elements to determine characteristics of network events and/or trends, and/or determine instructions and/or data for other devices, such as application servers, other managing servers, higher level devices, etc. A managing server may be configured with, or with access to, one or more databases in which data may be stored and queried. Data, as received or after processing by the managing server, may be distributed to other applications as needed and/or configured.

A managing server may instruct network elements on how to direct traffic flows and/or any other network traffic based on the data collected from smart agents and/or any other network data. Current costs for paths through a network may be calculated using such data, including overload data, and best paths determined for particular flows or more generally. Element configurations may be sent to network elements reflecting these calculations, thereby causing the elements to operate as instructed and determined by the managing server. In the event that a managing server determines that a particular element is overloaded, the managing server may reduce the number of configurations sent to that element or stop sending configurations to that element until the overload condition is resolved.

Figure 5:
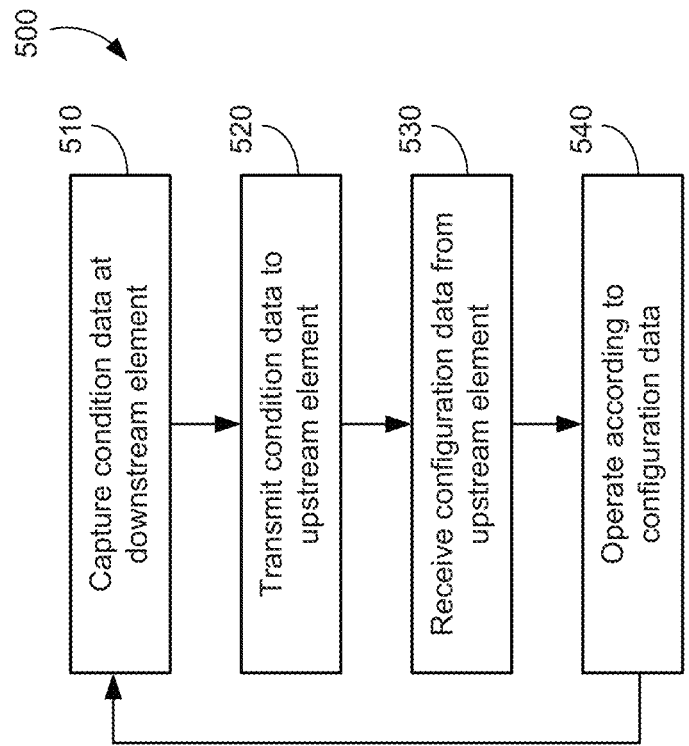
FIG. 5 illustrates a non-limiting exemplary method of implementing dynamic overload management.

FIG. 5 illustrates exemplary, non-limiting method 500 of implementing an embodiment as disclosed herein. Method 500, and the individual actions and functions describing in method 500, may be performed by any one or more devices, including those described herein. In an embodiment, method 500 may be performed by a downstream network element and/or a smart agent configured on any network element. Note that any of the functions and/or actions described in regard to any of the blocks of method 500 may be performed in any order, in isolation, with a subset of other functions and/or actions described in regard to any of the other blocks of method 500 or any other method described herein, and in combination with other functions and/or actions, including those described herein and those not set forth herein. All such embodiments are contemplated as within the scope of the present disclosure.

At block 510, device, virtual device, and/or network element condition data may be captured. Such capturing may be performed based on a configuration provided by a managing server. Such data may also be processed and/or stored based on a configuration of the capturing device that may have been provided by a managing server. Any type or form of data, data capture, processing, and/or storing of such data as set forth herein or otherwise may be used, and all such embodiments are contemplated as within the scope of the present disclosure.

At block 520, the condition data may be transmitted to an upstream network element or to a managing server. Such transmission may occur via any type and number of virtual or physical links, or any combination thereof At block 530, configuration data may be received from an upstream network element and/or a managing server. Configuration data may include instructions and configurations regarding how traffic may be routed and/or directed by the element, as well as instructions on the type, quantity, and quality of condition and/or other data to be collected (e.g., traces, logs of utilization, etc.), the level of detail to be collected for such data, whether and how to augment and/or aggregate such data, whether and how to report correlation data, whether and how to filter such data, reporting requirements (e.g., time and/or frequency of reporting condition data, conditions for reporting data at a particular priority, etc.), and any other relevant instructions. Instructions provided with configuration data may be tailored for individual elements or elements of a certain type or meeting any particular criteria may be provided the same instructions. At block 540, the element may operate according to the received configuration data, and proceed to capture element condition data as configured.

Figure 6:
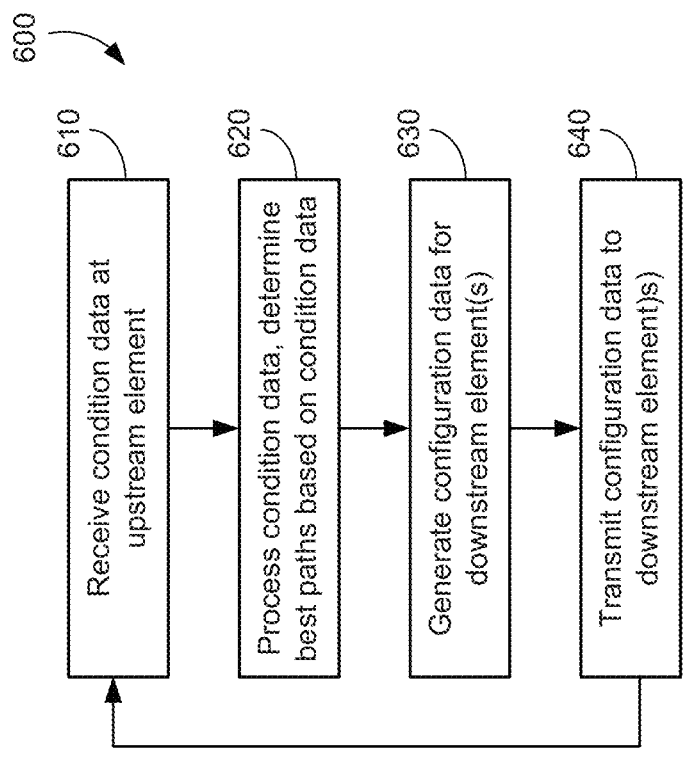
FIG. 6 illustrates another non-limiting exemplary method of implementing dynamic overload management.

FIG. 6 illustrates exemplary, non-limiting method 600 of implementing an embodiment as disclosed herein. Method 600, and the individual actions and functions describing in method 600, may be performed by any one or more devices, including those described herein. In an embodiment, method 600 may be performed by an upstream network element and/or a managing server configured to interact with network elements and/or smart agents. Note that any of the functions and/or actions described in regard to any of the blocks of method 600 may be performed in any order, in isolation, with a subset of other functions and/or actions described in regard to any of the other blocks of method 600 or any other method described herein, and in combination with other functions and/or actions, including those described herein and those not set forth herein. All such embodiments are contemplated as within the scope of the present disclosure.

At block 610, device, virtual device, and/or network element condition data may be received from downstream network elements and/or smart agents configured on any network device. Such capturing may be performed by the respective elements and/or smart agents based on one or more configurations provided by a managing server or upstream network element, in one embodiment, that is the same managing server or upstream network element receiving the captured data. Such reception may occur via any type and number of virtual or physical links, or any combination thereof At block 620, the condition data may be processed by the upstream network element or managing server. Any type or form of data, data capture, processing, and/or storing of such data as set forth herein or otherwise may be performed. In an embodiment, the received data may be processed to determine downstream and/or network element conditions, best paths for traffic flow based on those conditions, and any other determination that may be used to direct traffic and/or configure network elements. All such embodiments are contemplated as within the scope of the present disclosure.

At block 630, configuration data may be generated at the upstream network element and/or managing server. Configuration data may include instructions and configurations for network elements regarding how traffic may be routed and/or directed by such elements, as well as instructions on the type, quantity, and quality of condition and/or other data to be collected by such elements (e.g., traces, logs of utilization, etc.), the level of detail to be collected for such data, whether and how to augment and/or aggregate such data, whether and how to report correlation data, whether and how to filter such data, reporting requirements (e.g., time and/or frequency of reporting condition data, conditions for reporting data at a particular priority, etc.), and any other relevant instructions. Instructions and/or configuration data generated at block 630 may be tailored for individual elements, or elements of a certain type or meeting any particular criteria may be provided the same instructions. At block 640, the configuration data may be transmitted to one or more downstream elements or other network elements.

Note that in some embodiments, where method 600 may be implemented in an upstream network element, rather than generating configuration data, the upstream network element may itself direct and transmit traffic to particular downstream devices based on the received condition data and the destination of the traffic. All such embodiments are contemplated as within the scope of the present disclosure.

The methods and systems described above assist in providing improved customer service, especially when network performance is affected by outages, congestions, or any other event or occurrence that may degrade service provided to a subscriber. By implementing the present disclosure, the user experience may be improved by proactively addressing and mitigating the effects of service provided to a customer who may be affected by overloads or other network issues. Set forth below are further exemplary systems, devices, and components in which aspects of the disclosed overload management may be implemented.

Figure 7:
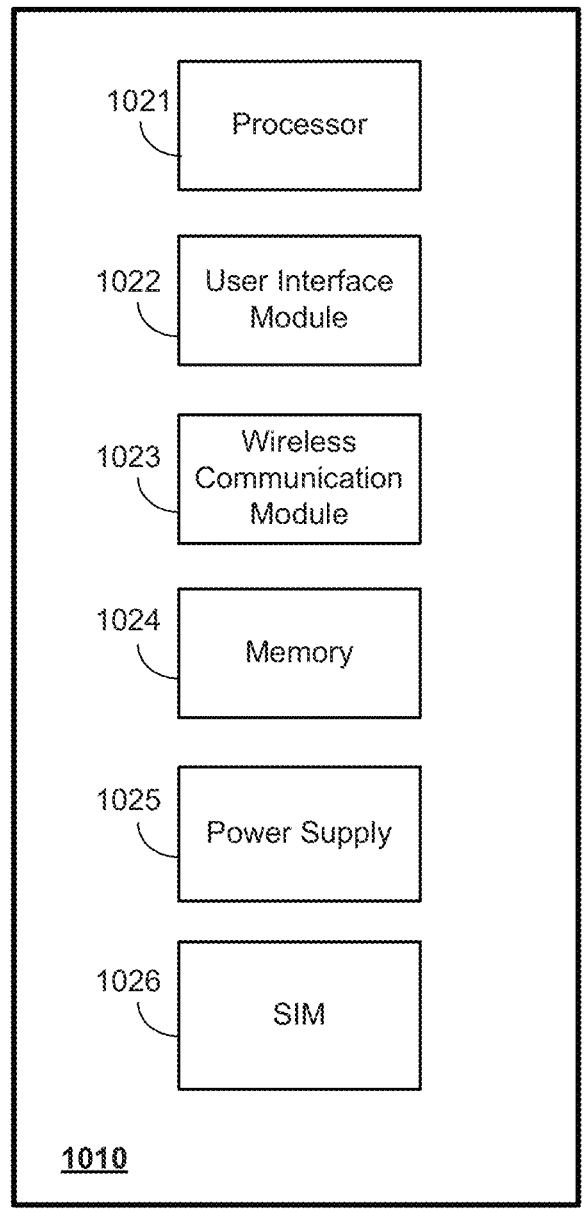
FIG. 7 is a block diagram of a non-limiting exemplary mobile device in which overload management may be implemented.

FIG. 7 illustrates an example wireless device 1010 that may be used in connection with an embodiment. References will also be made to other figures of the present disclosure as appropriate. For example, mobile devices 102, 210, and 410 may be wireless devices of the type described in regard to FIG. 7, and may have some, all, or none of the components and modules described in regard to FIG. 7. It will be appreciated that the components and modules of wireless device 1010 illustrated in FIG. 7 are illustrative, and that any number and type of components and/or modules may be present in wireless device 1010. In addition, the functions performed by any or all of the components and modules illustrated in FIG. 7 may be performed by any number of physical components. Thus, it is possible that in some embodiments the functionality of more than one component and/or module illustrated in FIG. 7 may be performed by any number or types of hardware and/or software.

Processor 1021 may be any type of circuitry that performs operations on behalf of wireless device 1010. In one embodiment, processor 1021 executes software (i.e., computer-readable instructions stored on a tangible computer-readable medium) that may include functionality related to overload management, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, charging and/or billing data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 8:
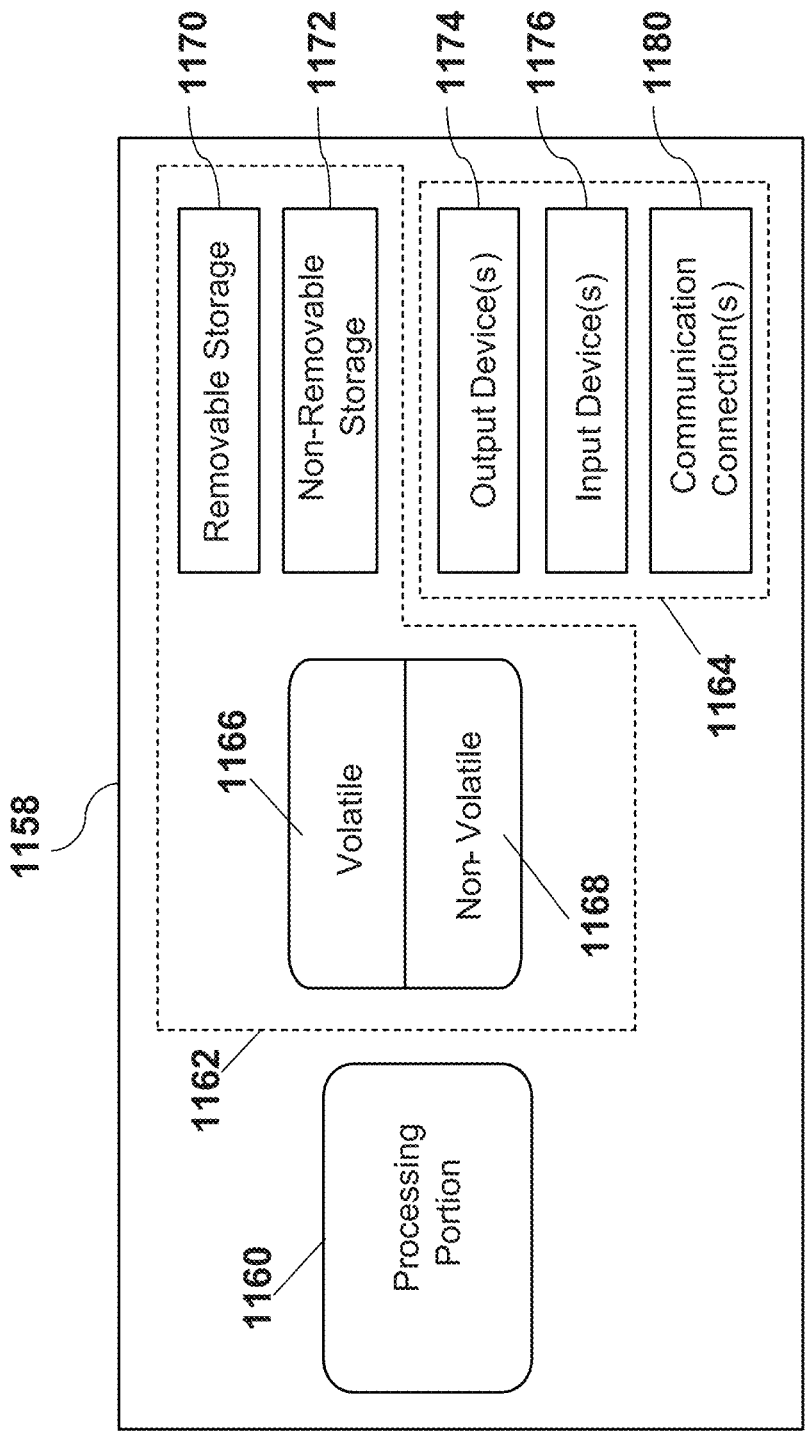
FIG. 8 is a block diagram of a non-limiting exemplary processor in which overload management may be implemented.

FIG. 8 is a block diagram of an example processor 1158 which may be employed in any of the embodiments described herein, including as one or more components of mobile devices 102, 210, and 410, as one or more components of network equipment such as eNode-Bs 140, MME 142, service gateway 144, PDN gateway 146, and any of devices any of the devices 220, 241, 242, 243, 244, 250, 310, 320, 420, 441, 442, 443, 444, 450, and 480, any other component of networks 106, 108, 110, 112, 201, and 401, and/or any related equipment, and/or as one or more components of any third party system or subsystem that may implement any portion of the subject matter described herein. It is emphasized that the block diagram depicted in FIG. 8 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof As depicted in FIG. 8, the processor 1158 comprises a processing portion 1160, a memory portion 1162, and an input/output portion 1164. The processing portion 1160, memory portion 1162, and input/output portion 1164 are coupled together (coupling not shown in FIG. 8) to allow communications between these portions. The input/output portion 1164 is capable of providing and/or receiving components, commands, and/or instructions, utilized to, for example, transmit and/or receive configuration data, transmit and receive device condition data, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for overload management, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof Computer storage media, such as memory and storage elements 1162, 1170, 1172, 1166, and 1168, may be tangible storage media that may include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein may include both storage media and communication media. The processor 1158 also may have input device(s) 1176 such as keyboard, keypad, mouse, pen, voice input device, touch input device, etc. Output device(s) 1174 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how overload management may be implemented with stationary and non-stationary network structures and architectures in order to manage overload. It will be appreciated, however, overload management as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE-Advanced. etc., as well as to other network services that become available in time. In this regard, overload management may be implemented independently of the method of data transport and does not depend on any particular network architecture or underlying protocols.

Figure 9:
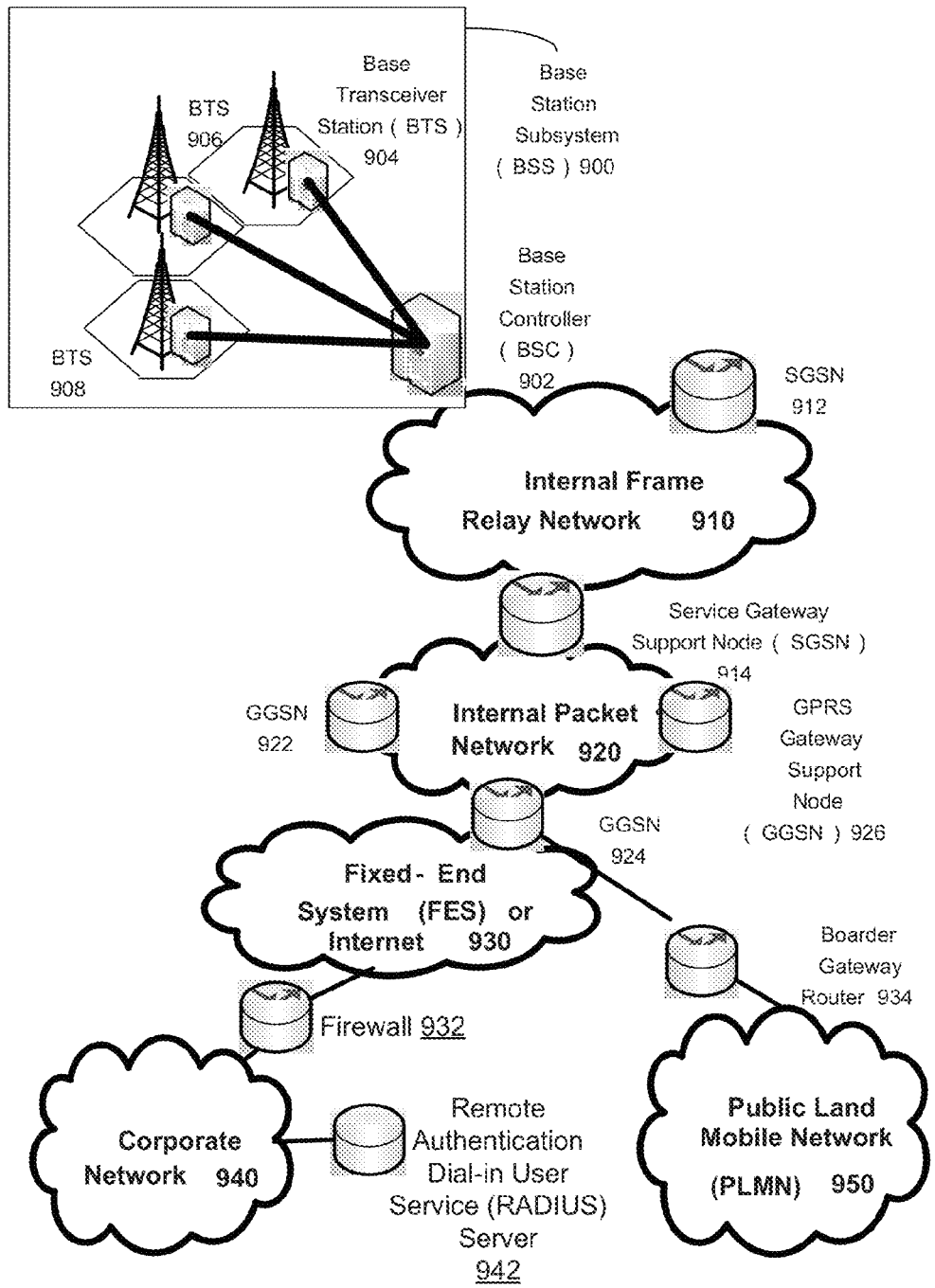
FIG. 9 is a block diagram of a non-limiting exemplary packet-based mobile cellular network environment, such as a GPRS network, in which overload management may be implemented.

FIG. 9 depicts an overall block diagram of an exemplary packet-based mobile cellular network environment, such as a GPRS network, in which overload management systems and methods such as those described herein may be practiced. In an example configuration, any RAN as described herein may be encompassed by or interact with the network environment depicted in FIG. 9. Similarly, mobile devices 102, 210, and 410 may communicate or interact with a network environment such as that depicted in FIG. 9. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 102, 210, and 410) become connected to the wireless network. In exemplary fashion, the packet traffic originating from user devices (e.g., mobile devices 102, 210, and 410) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc., may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 10:
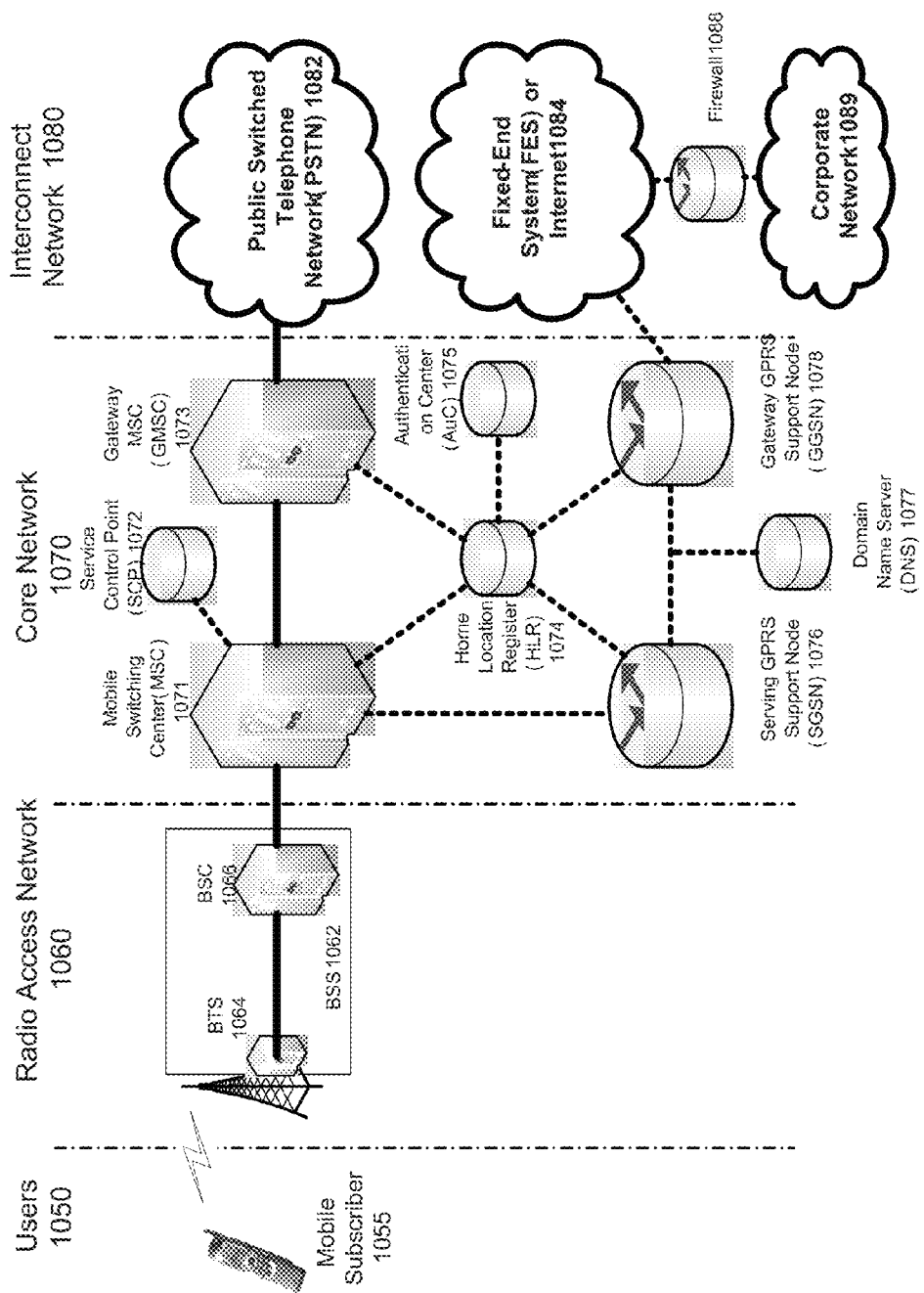
FIG. 10 illustrates a non-limiting exemplary architecture of a typical GPRS network, segmented into four groups, in which overload management may be implemented.

FIG. 10 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 10). In an example embodiment, the device depicted as mobile subscriber 1055 may comprise any of mobile devices 102, 210, and 410. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 10, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, any of the devices 220, 241, 242, 243, 244, 250, 310, 320, 420, 441, 442, 443, 444, 450, and 480 may be a device such as HLR 1074. HLR 1074 may store static information about the subscribers such as the International Mobile Subscriber Identity (IMSI), APN profiles, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 102, 210, and 410, used by an end user of a mobile cellular service or a wireless provider. When a mobile subscriber turns on his or her mobile device, the mobile device may go through an attach process by which the mobile device attaches to an SGSN of the GPRS network. In FIG. 10, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of overload management systems and methods such as those described herein may include, but are not limited to, Gateway GPRS Support Node tables, Fixed End System router tables, firewall systems, VPN tunnels, and any number of other network elements as required by the particular digital network.

Figure 11:
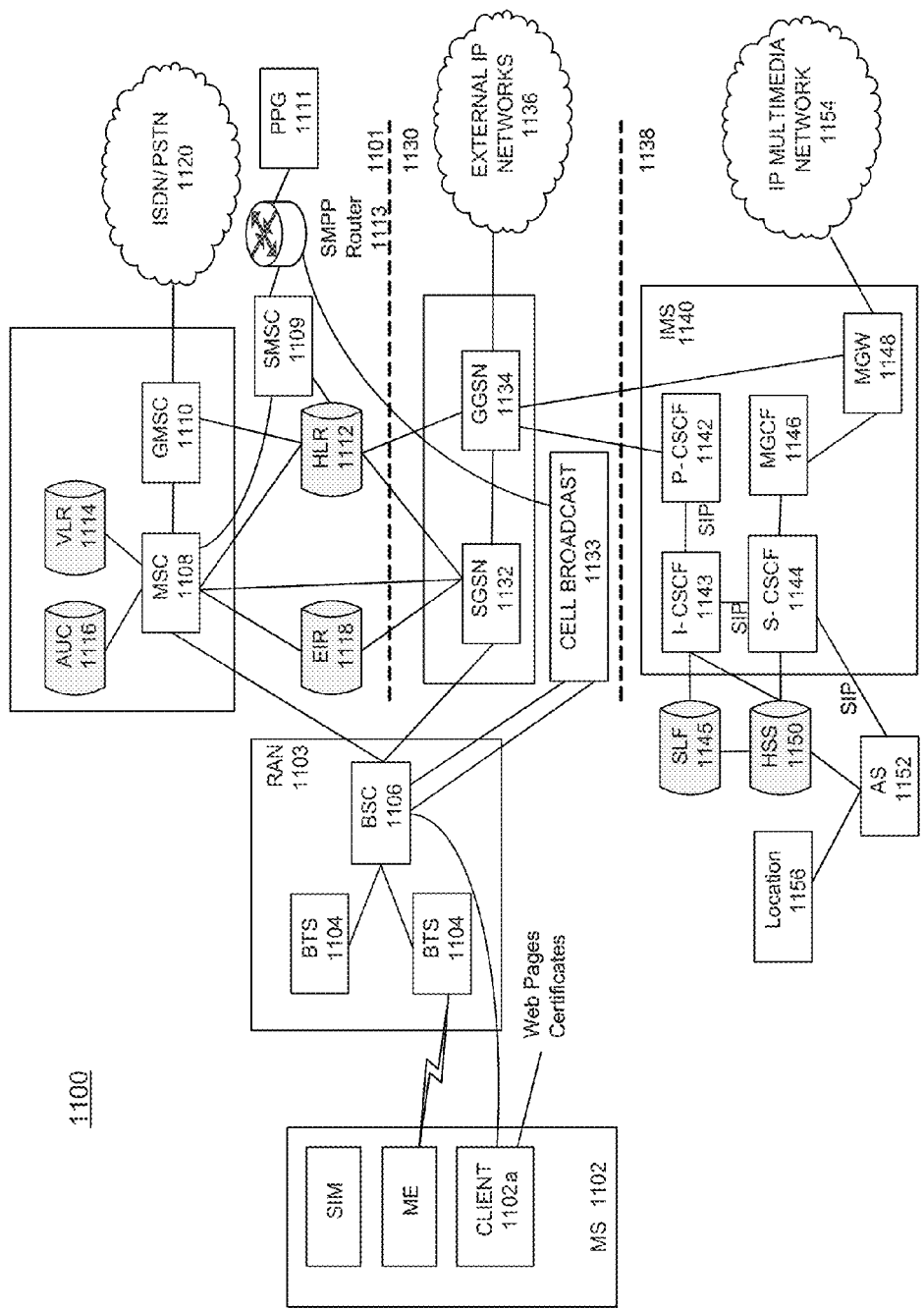
FIG. 11 illustrates a non-limiting alternate block diagram of an exemplary GSM/GPRS/IP multimedia network architecture in which overload management may be implemented.

FIG. 11 illustrates another exemplary block diagram view of a GSM/GPRS/IP multimedia network architecture 1100 in which the systems and methods for overload management such as those described herein may be incorporated. As illustrated, architecture 1100 of FIG. 11 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 102, 210, and 410) that is used by mobile subscribers, in one embodiment with a Subscriber identity Module (SIM). The SIM may include an International Mobile Subscriber Identity (IMSI), which may be a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for overload management have been described in connection with various communications devices and computing devices and processors, the underlying concepts can be applied to any communications or computing device, processor, or system capable of implementing the overload management systems and methods described. The various techniques described herein may be implemented in connection with hardware or software or, where appropriate, with a combination of both. Thus, the methods and apparatuses for overload management, or certain aspects or portions thereof, can take the form of program code (i.e., instructions) embodied in tangible and/or other media that is not a signal, such as floppy diskettes, CD-ROMs, hard drives, or any other machine-readable storage medium, wherein, when the program code is loaded into and executed by a machine, such as a computer, the machine becomes an apparatus for overload management. In the case of program code execution on programmable computers, the computing device may include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for overload management may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for overload management. When implemented on a general-purpose processor, the program code combines with the processor to provide a unique apparatus that operates to invoke the functionality of overload management as described herein. Additionally, any storage techniques used in connection with an overload management system may be a combination of hardware and software.

While overload management systems and methods have been described in connection with the various embodiments of the various figures, it is to be understood that other similar embodiments may be used or modifications and additions may be made to the described embodiments for performing the same function of overload management without deviating therefrom. For example, one skilled in the art will recognize overload management as described in the present application may apply to any environment, whether wired or wireless, and may be applied to any number of such devices connected via a communications network and interacting across the network. Therefore, overload management should not be limited to any single embodiment, but rather should be construed in breadth and scope in accordance with the appended claims.

What is claimed is:

1. A method comprising:
   receiving, via a dedicated link that is dedicated solely to communicating device condition indications, at a first network device comprising a processor and memory, from a plurality of network devices, device condition data for each of the plurality of network devices, wherein the first network device is upstream from the plurality of network devices, wherein each device condition data comprises a report of performance of a respective network device of the plurality of network devices, excluding the first network device;
   selecting, at the first network device, a second network device from among the plurality of network devices to transport a first traffic flow comprising data packets based on the device condition data; and
   transmitting, via a link other than the dedicated link, the first traffic flow from the first network device to the second network device.

2. The method of claim 1, wherein the transmitting of the first traffic flow to the second network device comprises transmitting configuration data to a third network device that causes the third network device to transmit the first traffic flow to the second network device.

3. The method of claim 1, wherein the device condition data comprises data indicating a utilization level of the second network device, and wherein the selecting of the second network device comprises determining that the second network device is less utilized than any other network device among the plurality of network devices.

4. The method of claim 1, wherein the receiving of the device condition data from the plurality of network devices comprises receiving data from a virtual device configured on the second network device, wherein the second network device comprises a plurality of virtual devices.

5. The method of claim 4, wherein the receiving of the data from the virtual device configured on the second network device comprises receiving the data via a virtual communications connection with the virtual device.

6. The method of claim 5, wherein the virtual communications connection is one of a plurality of virtual communications connections between the first network device and the second network device.

7. The method of claim 1, wherein the device condition data comprises data indicating that a utilization level of a third network device is above a threshold, the method further comprising generating an indication that a user device communicating with the third network device is unreachable.

8. A network device comprising:
a transceiver;
a memory comprising instructions; and
a processor, wherein the processor, when executing the instructions, effectuates operations comprising:
receiving, via a dedicated link that is dedicated solely to communicating device condition indications, device condition data for each of a plurality of network devices, wherein the network device is upstream from the plurality of network devices, wherein each device condition data comprises a report of performance of a respective network device of the plurality of network devices, excluding the network device;
selecting a second network device from among the plurality of network devices to transport a first traffic flow comprising data packets based on the device condition data; and
transmitting, via a link other than the dedicated link, the first traffic flow to the second network device.

9. The network device of claim 8, wherein the operation of transmitting the first traffic flow to the second network device comprises transmitting configuration data to a third network device that causes the third device to transmit the first traffic flow to the second network device.

10. The network device of claim 8, wherein the device condition data comprises data indicating a utilization level of the second network device, and wherein the operation of selecting the second network device comprises determining the second network device is less utilized than another network device among the plurality of network devices.

11. The network device of claim 8, wherein the operation of receiving the device condition data from the plurality of network devices comprises receiving data from a virtual device configured on the second network device, wherein the second network device comprises a plurality of virtual devices.

12. The network device of claim 8, wherein the operation of receiving the device condition data from the plurality of network devices comprises receiving an alarm indicating an overload condition from one of the plurality of downstream network devices.

13. The network device of claim 8, wherein the operations further comprise transmitting, to each of the plurality of network devices, configuration data that configures traffic flow routing on each respective downstream network device of the plurality of network devices.

14. The network device of claim 8, wherein the operations further comprise transmitting, to each of the plurality of network devices, data collection instructions that instruct each respective network device of the plurality of network devices to collect particular device condition data.

15. A tangible computer-readable storage medium comprising computer-executable instructions, which when executed by a processor of a first network device, cause the processor to effectuate operations comprising:
receiving, via a dedicated link that is dedicated solely to communicating device condition indications, from a plurality of downstream network devices, device condition data for each of the plurality of downstream network devices, wherein each device condition data comprises a report of performance of a respective network device of the plurality of downstream network devices, excluding the first network device;
selecting a second network device from among the plurality of downstream network devices to transport a first traffic flow comprising data packets based on the device condition data; and
transmitting via a link other than the dedicated link, the first traffic flow to the second network device.

16. The tangible computer-readable storage medium of claim 15, wherein the operations further comprise transmitting, to each of the plurality of downstream network devices, configuration data that configures traffic flow routing on each respective downstream network device of the plurality of downstream network devices.

17. The tangible computer-readable storage medium of claim 15, wherein the operations further comprise transmitting, to each of the plurality of downstream network devices, data collection instructions that instruct each respective downstream network device of the plurality of downstream network devices to collect particular device condition data.

18. The tangible computer-readable storage medium of claim 15, wherein the device condition data is received from a smart agent configured on each of the plurality of downstream network devices.

19. The tangible computer-readable storage medium of claim 15, wherein the device condition data is received from a virtual device configured on each of the plurality of downstream network devices.

20. The tangible computer-readable storage medium of claim 15, wherein the operations further comprise:
selecting a third network device from among the plurality of downstream network devices for a second traffic flow based on the device condition data; and
transmitting the second traffic flow to the third network device.

* * * * *